May 19, 1936.  E. J. ROGERS  2,041,151
FLIGHT METER
Filed Dec. 15, 1931  4 Sheets-Sheet 1

Inventor
E. J. Rogers
By Watson E. Coleman
Attorney

May 19, 1936. E. J. ROGERS 2,041,151
FLIGHT METER
Filed Dec. 15, 1931 4 Sheets-Sheet 2
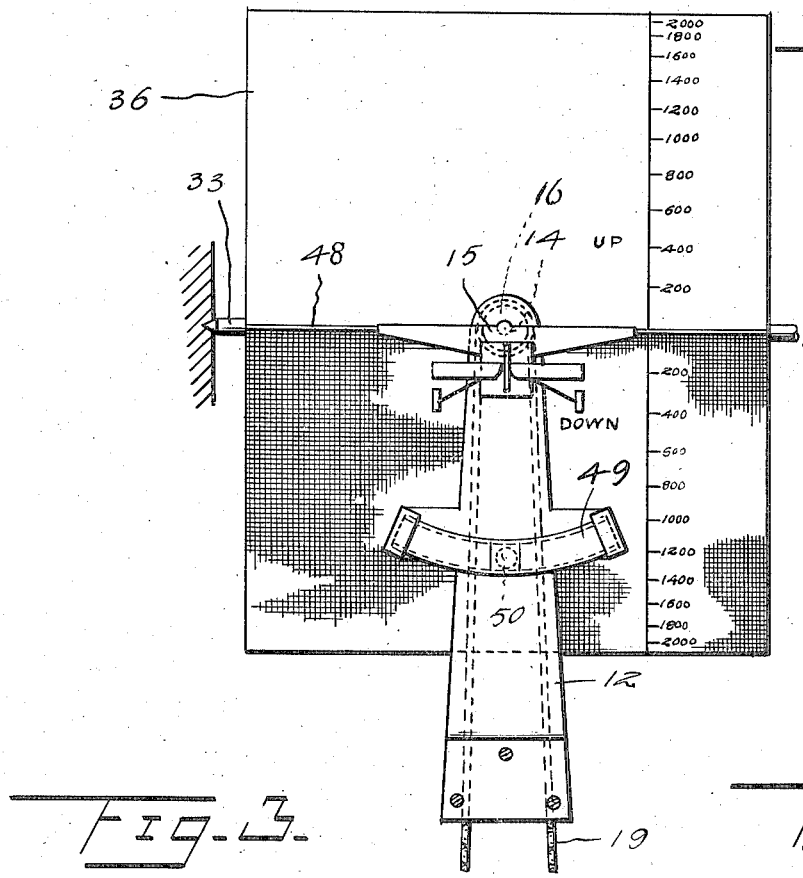
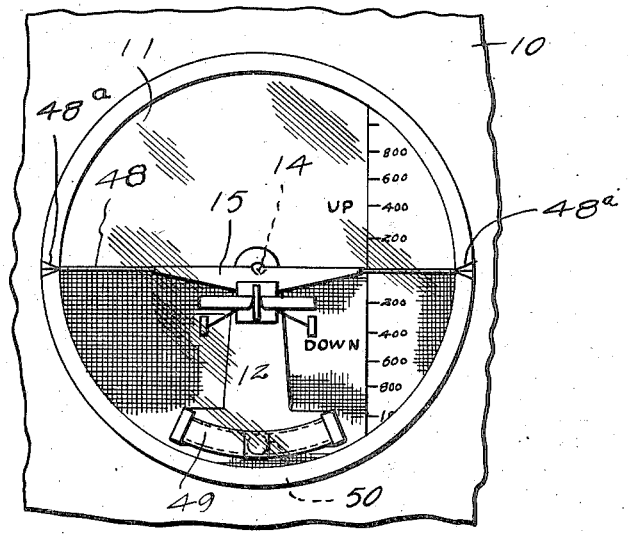
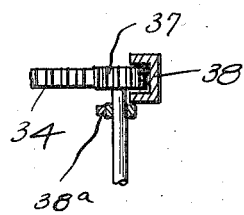
Inventor
E. J. Rogers
By Watson E. Coleman
Attorney

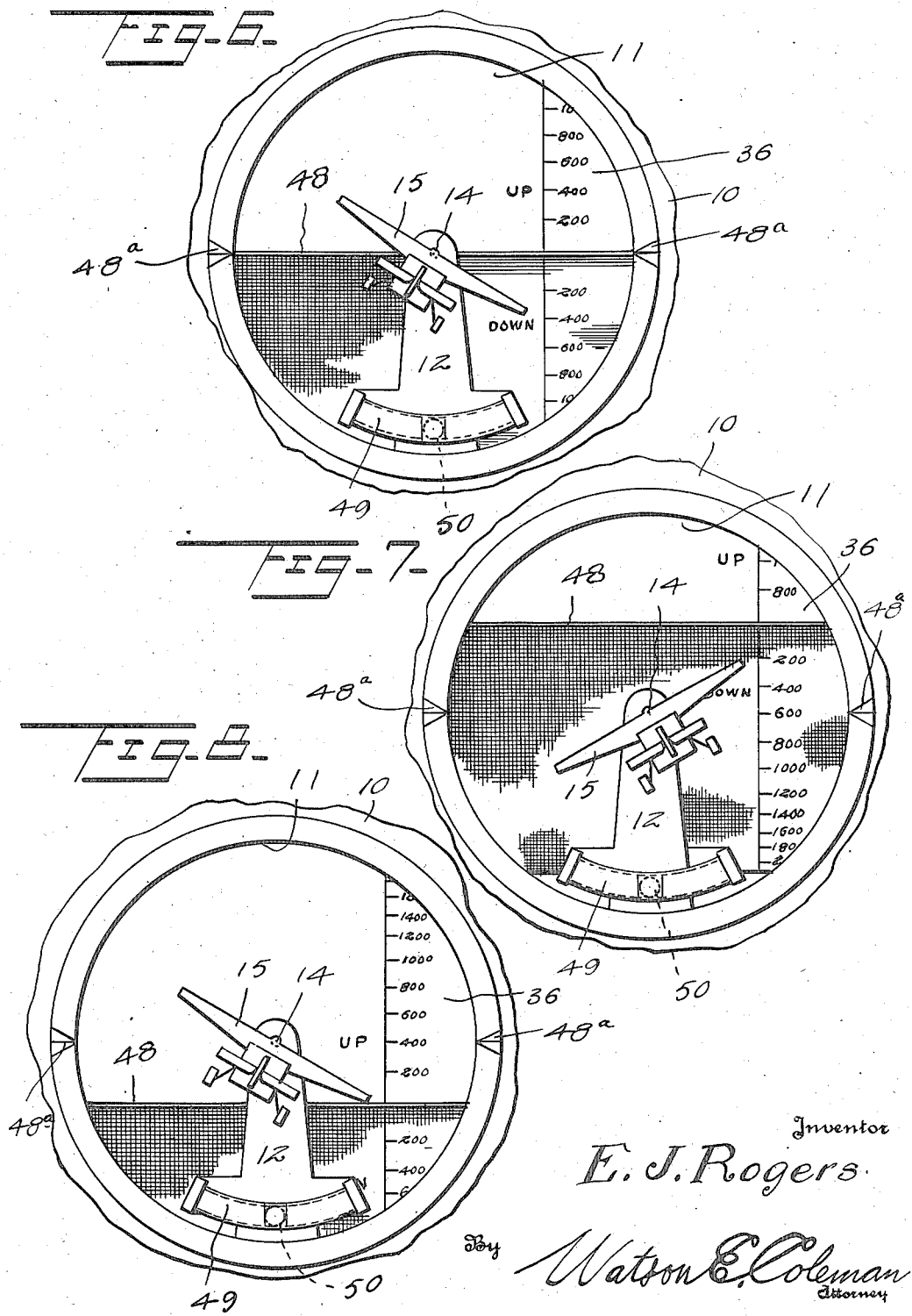

May 19, 1936.  E. J. ROGERS  2,041,151
FLIGHT METER
Filed Dec. 15, 1931   4 Sheets-Sheet 4

Inventor
E. J. Rogers
By Watson E. Coleman
Attorney

Patented May 19, 1936

2,041,151

UNITED STATES PATENT OFFICE 2,041,151

FLIGHT METER

Elmer J. Rogers, Randolph Field, Tex.

Application December 15, 1931, Serial No. 581,213

9 Claims. (Cl. 33—204)

This invention relates to indicating instruments for airplanes and particularly to an instrument for indicating turn and climb. In flying "blind", the pilot of the airplane secures his information with regard to turns and banks from a gyroscopic bank and turn indicator and secures his information as to the rate of climb by a rate of climb indicator which operates under differential pressure. Associated with the turn indicator is a bank indicator. Of course, there are other instruments which the pilot must constantly read and it is most desirable, therefore, to reduce the number of these instruments as much as possible.

The general object of my invention, therefore, is to provide a single instrument whereby the pilot can measure his degree of turn, his rate of climb and the amount of slips and skids, should they occur when his plane of reference is obscured or is entirely lacking, as is the case in what is known as blind flying.

It is a further object of the invention to reduce the number of instruments which the pilot must read and thus reduce the amount of interpretation required in blind flying. This interpretation is necessary because, referring to the ordinary flying meter instruments commonly used, needle movements on a graduated dial are a radical departure from those indications which a pilot ordinarily uses to control the flight path of his airplane under normal flight conditions where he can, as it were, visualize precisely what he is doing.

A further object of the invention is to provide a mechanism of this character which will assist the pilot to inhibit his sensations. This is necessary because, due to the physiology of the vestibular labyrinth, a pilot's sensations when flying blind are in direct contradiction to his instrument readings. It is necessary, therefore, for him to inhibit his sensations and respond to his instrument readings, in order to avoid disaster.

A further object is to provide the pilot with a picture, as it were, more nearly resembling that which he visualizes under normal flying conditions, thus making the pilot's reactions when flying blind less mechanical and giving him, therefore, more confidence in himself.

Another object is to provide an instrument which will enable the pilot to read the instruments with the least possible concentration, thus reducing fatigue when flying blind, this fatigue being due largely to the number of instruments which he must read, the amount of interpretations required, the fact that he is obliged to inhibit his sensations in order to properly read the instrument and because the movement of indicating needles does not supply him with any accurate visualization of the actual condition of affairs.

A further object is to provide an instrument of this character which will allow the pilot a complete range of maneuverability, which will enable the pilot to obtain all the stimuli necessary, from a single dial, to control the flight of his airplane when flying blind, and further to provide an instrument which will speed up the pilot's reactions when flying blind and thus lessen the possibility of the pilot's losing control of the airplane during the time between the receipt of the sensations and his reaction and adjustment to the changed conditions.

Other objects will appear in the course of the following description.

My invention is illustrated in the accompanying drawings, wherein:—

Figure 1 is a vertical sectional view through a flight indicator constructed in accordance with my invention;

Figure 1a is a fragmentary section on the line 1a of Figure 1;

Figure 2 is a section on the line 2—2 of Figure 1;

Figure 3 is a fragmentary face view of the instrument looking through the observation opening thereof;

Figure 4 is a section on the line 4—4 of Figure 1;

Figure 5 is a section on the line 5—5 of Figure 1;

Figures 6, 7, 8, 9 and 10 are diagrammatic views of the observation opening showing the position of the indicator in different flying positions of the airplane.

Figure 9:
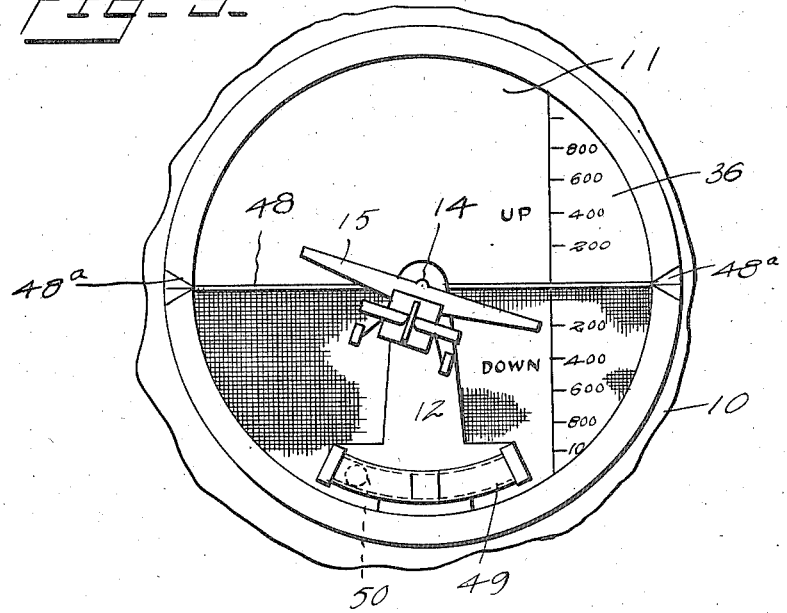

In Figures 1 to 5 I illustrate my flight meter. 10 designates an exterior case having an observation opening 11 constituting a frame defining the field of view. Disposed upon the front wall of this case 10 immediately in front of a dial is a supporting plate 12 which is attached at 13 to the front wall of the instrument and may be of any suitable character and carries upon it the shaft 14. Upon the front end of this shaft is mounted the miniature similitude of an airplane designated 15. This symbol of an airplane represents diagrammatically the body of the airplane, the laterally extending aerofoils thereof, the landing wheels, the elevators and the rudder. It is sufficient, however, if this similitude generally represents the airplane and particularly the wings or aerofoils thereof.

Mounted upon the shaft 14 is shown a very small sprocket wheel 16. Mounted in suitable bearings adjacent the lower end of the case is a shaft 17 carrying a sprocket wheel 18 and passing over the sprocket wheels 16 and 18 is a sprocket chain 19. At this point it may be remarked that other means for transmitting rotary movement from the shaft 17 to the shaft 14 may be used.

Disposed within the outer casing 10 is a casing 20 within which is disposed a gyroscopic turn indicator. This includes a frame 21 mounted for axial rotation on the fore and aft bearings 22. Mounted within this frame is the gyroscope wheel 23. This gyroscope is constantly driven by a jet of air projected from a jet nozzle 24 against the periphery of the wheel 23. This jet nozzle is connected by a tube 25 to the exterior of the case 10. From the case 20 leads an air outlet pipe 26 which in turn leads to a Venturi tube 27 mounted on one of the wings of the plane or in any other suitable position so that the passage of air through the Venturi tube in the direction of the arrows in Figure 1 will cause air to be sucked through the tube 26 out through the case 20 and cause air to be sucked in through the nozzle 24 and be projected against the gyroscope 23.

Mounted upon the frame 21 and rotating with this frame is a plate 28, the upper end of which carries an outwardly projecting pin 29 and connected by a spring 30 to the casing 20. The lower edge of the plate 28 is arcuate and toothed at 31 and this toothed edge engages with a pinion 32 mounted upon the shaft 17. It thus follows that as the frame 21 is tipped relative to the case 10, the shaft 17 will be rotated which in turn will rotate the shaft 14 and thus tilt the miniature airplane 17 in one direction or the other.

It will be understood, of course, that the gyroscope 23 rotates rapidly on its bearings in the frame 21, its axis of rotation corresponding to the lateral axis of the airplane and the frame 21 extending fore and aft with relation to the airplane. It will be obvious, therefore, that the gyroscope is free to turn about two axes; one its rotational axis 23ᵃ and the other the longitudinal axis of the frame on the bearings 22. The only axis about which the axis cannot turn, therefore, is the vertical or turning axis of the airplane. It is a well-known characteristic of a gyroscope that it will attempt to precess to set its spin in alinement with any axis about which it is turned. If the whole instrument is turned about a vertical axis as is the case when the instrument is mounted on an airplane which turns, the gyroscope 23 will attempt to move its axis 23ᵃ into coincidence with the axis about which it is being turned and it does this in such a way that it will rotate in the same direction as the direction of turn. Thus as the airplane turns to the right, the top of the plate 28 will move away from the spectator in Figure 1 while the lower edge of the plate will move toward the spectator in Figure 1. The movement of the plate 28 causes the rotation of shaft 17 and the rotation of the shaft 14 and this will move the airplane figure 15 so that this airplane figure will tilt in exactly the same direction as the plane itself is being turned toward the right or toward the left. Thus when the ship is disposed in a lateral horizontal plane or a neutral position, the wings of the airplane 15 are horizontal, but as the airplane turns, the action of the gyroscope causes the shaft 14 to rotate and causes the airplane to indicate a bank in the direction the airplane is turning. The degree of bank will correspond to the degree of curvature in which the airplane is turning. It is to be understood in this connection that this support 12 should be made as small as possible in order to cover as little of the dial or observation opening as possible. The shaft 14 should be capable of an angular rotation of 160°, making airplane figure 15, capable of giving a maximum indication of a bank of 80° to right or left.

In order to provide means whereby the pilot may see the rate at which the airplane is climbing or descending, I provide a climb indicator which is visible immediately behind figure 15 of the ship. To this end I provide a transverse shaft 33 mounted within the casing 10 in any suitable manner and carrying upon it the toothed wheel 34. The shaft is urged to a neutral position by any suitable means. Also mounted upon this shaft are radial arms 35 carrying upon them an arcuate plate 36 which has the form of a section of a cylinder concentric to the axis 33. This plate 36 is disposed immediately behind the figure 15 of the ship. Co-acting with the toothed wheel 34 is a pinion 37 engaged by a vertically movable toothed rack 38 held to the pinion by a rod 38ᵃ. The rack is carried by a lever 39 pivoted at 40. Disposed within an inner casing 10ᵃ is an expansible and contractible diaphragm or capsule 41. One wall of this diaphragm is fixed to a hollow support 42, the other wall of the diaphragm being movable and being connected by a link 43 to the lever 39. Extending through one wall of the casing 10ᵃ is a hollow or tubular nipple 44, the interior of this nipple opening to the exterior air as at 45. Disposed over this opening is a cap 45ᵃ constituting a damper, there being small openings 46ᵇ through this cap admitting atmospheric air to the interior of the cap and through the opening 45. From the hollow interior of the nipple extends a small pipe 46 which discharges through the hollow support 42 into the interior of the diaphragm. Also from the nipple extends a small capillary tube 47 of very small diameter which opens into the interior of the chamber 10ᵃ. This tube 47 is of much smaller diameter than the tube 46.

The operation of this diaphragm to control the lever 39 is as follows:—When the airplane is maintaining a constant altitude and, therefore, is flying in air of constant pressure, there will be no difference between the pressure of the air within the diaphragm and the pressure of the air exterior to the diaphragm but assuming that the airplane starts to climb, then air enters the interior of the diaphragm at a lower pressure than the pressure of the air which was in the diaphragm previously. This reduction of pressure is immediately felt in the interior of the diaphragm because of the relatively large size of the tube 46. The air inside of the casing 10ᵃ, however, still remains at the pressure corresponding to the previous elevation of the airplane and this pressure can only be reduced by the flow of this air through the capillary tube 47 which constitutes in point of fact a bleed opening. So long as the airplane continues to climb, there is less pressure inside of the diaphragm than outside, because as the airplane climbs, it is entirely impossible for the air within the chamber 10ᵃ to catch up or become equalized with the outside pressure. This excess pressure outside the diaphragm will cause the diaphragm to partially collapse and this will cause a downward movement of the lever 39. This will cause a rotation of the coacting gear wheels 37 and 34 and a rotation of the shaft 33 and cylinder 36 in the direction of the arrow in Figure 1. If on the other hand, the airplane moves downward, there will be greater pressure within the bulb of the diaphragm than without the diaphragm so that the diaphragm will expand, moving the cylindrical portion 36 in an opposite direction.

This arcuate plate 36 which forms the section of a cylinder, as before stated, is provided with a zero line 48. The lower half of the dial is colored or blackened while the upper half is shown as white. The dial has rate of climb indications from this zero point, these climb indications being shown as in increments of 200 ft. Any other notation may be used, however, that may be found desirable. If the airplane flies in practically a horizontal plane, it is obvious that the air pressures on the inside and outside of the bulb 41 will equalize and when equalized the zero line 48 will be in line with the pointers 48ᵃ marked at opposite points on the wall of the sight opening 11. As the airplane rises, however, the dial 36 will move downward with relation to the figure of the airplane designated 15 and with the relation to the pointers 48ᵃ. If the altitude of the airplane is decreasing, however, the dial 36 will move upward showing the rate of descent. The dial 36 is, of course, of very light material. The angular rotation of the shaft 33 to represent a climb of 1000 feet will be less than 45° whereas the angular rotation of the shaft carrying the indicating needle in the ordinary climb indicator is about 90°. While I have heretofore referred to this dial 36 as being arcuate, it will be understood that the dial 36 may be balanced by a like arcuate plate 36ᵃ if necessary and that gearing may be used to increase the force applied to the shaft 33 or multiply the range of movement of the shaft 33 with reference to the range of movement of the diaphragm. It is within the scope of my invention to provide any means between the diaphragm and the shaft 33 which will secure sufficient power to move the shaft 33 by the relatively slight movement of the diaphragm or to secure a sufficient range of movement for the shaft 33.

Preferably mounted upon the plate 12 is a slightly curved glass tube 49 which contains liquid and which also contains a ball 50. The tube is curved so that the ball rests in the middle of the tube when the airplane is in straight and level flight. This ball indicates the lateral movement of the control stick and will indicate whether the right or left wing is too high or too low, whether there is not sufficient bank on a turn or whether there is too much bank on a turn. While I have illustrated this device as applied to my instrument and used in combination with a tiltable airplane figure, it is to be understood that by itself it forms no part of my invention.

Figure 10:
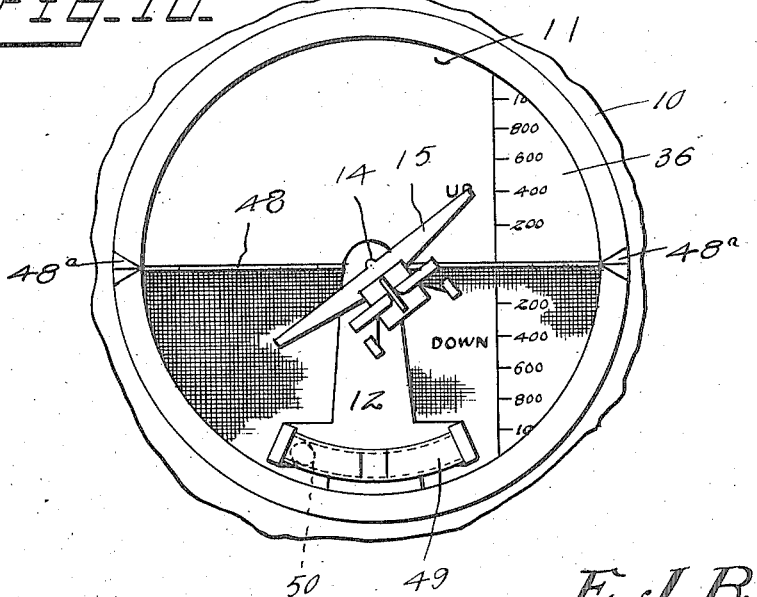

In Figures 6 to 10, I illustrate a number of different positions which will be taken by the airship indicator 15 and the dial 36 in various flying positions. In Figure 10 the position of the ball 50 in the left hand end of the tube 49 shows that the ship is slipping to the left and that there is insufficient left rudder. In Figure 9, the position of the ship 15 and of the ball indicates that there is excessive right rudder with a skidding to the left.

In Figure 8, inasmuch as the ball is in the middle of the tube 49 it indicates that the machine is correctly banked and inasmuch as the zero line has moved downward below the ship, it will be seen that there is a correctly banked climbing turn to the right.

In Figure 7, the position of the parts shows that there is a correctly banked gliding turn to the left, the horizon line having moved upward to indicate that the machine is gliding. In Figure 6, the machine is shown as turning on a level to the right and the position of the ball shows that the machine has been correctly banked.

It is to be understood, of course, that in order to properly turn an airplane in flight, the airplane must be banked, and in a properly executed turn, the degree of bank must be consistent with the speed of turn. The faster the airplane turns, then the greater is the deviation of the gyroscopic disk 23 from its neutral position and the steeper is the bank indicated by the airplane figure 15. As long as the degree of bank of the actual airplane is consistent with its speed of turn, then the degree of bank indicated by the airplane figure will exactly correspond with the degree of bank of the actual airplane. The function of the ball 50 in the tube 49 is as follows:—

In normal flight, the pilot makes the speed of turn of his airplane consistent with the amount of bank he has applied by watching the flow of horizon past the nose of his airplane. In blind flying when the horizon is obscured and the pilot has no plane of reference, he cannot tell how much rudder to apply in order to make a turn unless the necessary information is supplied him from a source within the cockpit of the airplane. This information is given him by the ball 50. The pilot has only to imagine that his control stick is fastened to the center of the airplane figure in the flight meter and perpendicular to the wings and imagine that his rudder controls the position of the ball. As he applies his ailerons, the airplane begins to turn and the airplane figure indicates a bank. If the amount of rudder he applied was correct, centrifugal force will be straight down through the floor of the airplane and the ball will remain in the center of the tube. The airplane figure then indicates the true degree of bank of the actual airplane.

If the amount of rudder applied was excessive, the airplane will skid outward and the ball will be forced to the high side of the tube, indicating a skid to the pilot. The pilot then has only to remove enough of the rudder he has applied to bring the ball back to the center of the tube and thus assume a properly executed bank. If the amount of rudder applied was insufficient the airplane will slip toward the inside of the turn and the centrifugal force generated by the turn will not be great enough to overcome the effect of gravity and the ball will roll down to the low side of the tube, indicating a "slip" to the pilot. The pilot then has only to sufficiently increase the amount of the rudder he has applied to return the ball to the center of the tube and thus assume a properly executed bank. With the ball in the center, a bank as represented by the airplane figure will be the true bank of the actual airplane.

It will be seen that the indicator 36 does not indicate altitude or pitch, but indicates rate of climb or rate of descent. For instance, the pilot will obtain a constant reading on the dial 36 as in Figure 8 from the start of the climb to the finish, whether the climb ends at 500 or at 8000 feet. Now when the pilot attains the desired altitude, he levels his plane and assumes a level flight. Then the pressure within the diaphragm 41 and within the case 10ª will be equalized and the horizon line 48 is opposite the zero index 48ª. Spiraling down, for instance, from 8000 feet, the process will be reversed and the pilot would obtain a reading as is illustrated in Figure 7. In Figure 8, the flight meter shows that the airplane is in a 40° bank with the proper amount of rudder applied to turn the airplane at a speed consistent with that degree of bank and that the plane is climbing at the rate of 400 feet, a minute.

It is particularly important from a practical standpoint that in a flight meter of the character described, the figure of the airplane or ship should be tiltably mounted in relation to a line indicating the horizon, which line is fixed with relation to the ship itself. From the standpoint of the pilot, whose life depends on the indications he receives from his flight instrument, it makes a very material difference whether the airplane figure tilts in relation to a line indicating the horizon or whether this line indicating the horizon tilts relative to the figure. Under normal conditions of weather and visibility, the pilot controls the attitude of his plane in flight by flying it in relation to a plane of reference formed by the surface of the earth. He banks and turns his airplane in relation to this fixed plane of reference. When the pilot is forced to fly "blind," as he is under certain conditions of fog, clouds, rain or darkness, he must rely on his flight instruments to furnish him with the stimuli he can no longer receive from outside visual reference. These instruments should present him with a picture as nearly like that which he sees normally as it is possible to do. I believe my flight meter depicts this picture to the pilot more accurately and in a more natural form than any other instrument. The line representing the horizon is fixed and remains stationary (insofar as the banking of the airplane is concerned) furnishing a plane of reference just as the normal horizon remains fixed and furnishes the pilot with a plane of reference. As the pilot moves the controls of his airplane to make it bank, there is a corresponding bank of the airplane figure which tilts in relation to the fixed horizon line and in relation to other objects in the pilot's cockpit. My flight meter requires no interpretation by the pilot for he sees the movement of his control stick followed by a movement of the airplane figure in relation to the fixed plane of reference just as under normal conditions he sees the movement of his control stick followed by the movement of the airplane in relation to the fixed natural horizon.

When the pilot can see nothing except the objects within the cockpit of his airplane, he can derive a sense of changes in direction of flight only through the movement of indicating elements of his instruments and the relation of these movements to other objects in the cockpit. When the airplane figure in my indicator tilts in relation to the fixed objects in the cockpit, subconsciously the pilot reacts to the banking of the actual airplane. When the airplane figure has no movement and remains fixed in relation to all other objects in the cockpit, the pilot has to literally force himself to visualize any change in the attitude of the actual airplane. There has been no change in the position of the airplane figure and it is difficult for the pilot to visualize a change in the attitude of the actual airplane simply because the horizon line has become tilted. This has been my own experience and that of countless other pilots learning to fly "blind". My structure reduces "interpretation and fatigue" to a minimum. This is a very important point under actual flight conditions. It is an actual fact that I have many times seen pilots learning to fly blind by an instrument in which the line representing the horizon tilts and the airplane figure is fixed, react to the tilting of the horizon line by moving the controls in a direction exactly opposite to the way they should, thus increasing the bank of the actual airplane when they were attempting to recover from a bank.

Another important feature is the combination with a tiltable airplane figure of the tube 49 with the ball 50 therein. In this combination, the tube 49 is used as a turn element indicator and the pilot watches the tube to guide him in his use of the rudder. The tube 49 is not used as a banking element. With my device, I do away with the necessity of using an indicating needle to indicate the amount of rudder and I do this for the reason that needle movements on a graduated dial are a radical departure from what the pilot sees in normal flight and thus the use of a needle operating over a graduated dial in blind flying requires a great deal of interpretation and conscious effort and results in fatigue and sluggish and inaccurate reactions.

I claim:—

1. A flight meter for airplanes including a frame, an airplane figure mounted within said frame for lateral tilting movement relative to the frame, and means operated by the turning movement of the airplane causing the automatic tilting of said figure from a transversely horizontal position to a transversely tilted position in either direction to an extent corresponding to the turning movement of the airplane, a dial disposed behind the airplane figure and movable vertically with relation thereto and having upon it a zero indication and rate of climb indications, and means responsive to a change in air pressure upon a rising or falling movement of the air plane operating to respectively depress or elevate the dial to carry its zero indications above or below the airplane figure.

2. A flight meter for airplanes including a frame, an airplane figure mounted within said frame for lateral tilting movement relative thereto, means operated by a turning movement of the airplane causing the automatic tilting of said figure from a transversely horizontal position to a transversely tilted position in either direction to an extent corresponding to the turning movement of the airplane, an arcuate dial disposed behind the airplane figure, and movable around an axis at right angles to the tilting axis of the airplane figure, the dial being concentric to its axis and having upon it a zero indication and rate indications reading in opposite directions from the zero indication, and means responsive to a change in air pressure upon a rising or falling movement of the airplane operating to move the dial about its axis to carry its zero indication above or below the airplane figure.

3. A flight meter for airplanes including a casing having a sight opening defining a field of view, a support within the casing extending to the approximate center of said field defined by said side opening, a shaft mounted upon said support, a miniature airplane figure mounted upon said shaft for lateral tilting movement in either direction, gyroscopic means disposed within the casing and operatively engaged with said shaft for causing an oscillatory movement of the shaft in one direction or the other as the airplane turns to the right or to the left to thereby tilt the airplane figure from a transversely horizontal position to a transversely tilted position in either direction to an extent corresponding to the turning movement of the airplane, a vertically movable dial disposed behind the airplane figure, the dial being mounted for oscillation upon a horizontal shaft extending normally to the shaft upon which the airplane figure is mounted, the face of the dial being concentric to the dial shaft and having a zero indication and rate indications reading in opposite directions from the zero indication, the wall defining the sight opening having opposed index marks coacting with said indications on the dial, and means actuated by change in air pressure due to a rising or falling movement of the airplane operating respectively to swing the dial downward or swing it upward to carry its zero indication above or below the airplane figure.

4. A flight meter for airplanes including a casing having a sight opening defining a field of view, a support within the casing extending to the approximate center of said field, a shaft mounted upon said support, a miniature airplane figure mounted upon said shaft for lateral tilting movement in either direction, gyroscopic means disposed within the casing and operatively engaged with said shaft for causing an oscillatory movement of the shaft in one direction or the other as the airplane turns to the right or to the left to thereby tilt the airplane figure from a transversely horizontal position to a transversely tilted position in either direction to an extent corresponding to the turning movement of the airplane, a dial disposed behind the airplane figure and having a face presented toward the figure, the dial being mounted for oscillation upon a horizontal shaft normal to the shaft upon which the airplane figure is mounted, the face of the dial being concentric to the dial shaft and having a zero indication and rate indications reading in opposite directions from the zero indication, the wall defining the sight opening having opposed index marks coacting with said indications on the dial, a diaphragm mounted within said casing, means admitting outside air freely to one side of said diaphragm, constricted means admitting air to the other side of said diaphragm, and operative connections between the diaphragm and the shaft upon which the dial is mounted causing the oscillation of said dial in one direction when the diaphragm is shifted in one direction by an overbalancing pressure of air on one side of the diaphragm, and shifting the dial in the opposite direction when the diaphragm is shifted by an overbalancing pressure on the other side of the diaphragm.

5. A flight meter for airplanes including a casing having a sight opening defining a field, a support within the casing extending to the approximate center of said field, a shaft mounted upon said support, a miniature airplane figure mounted upon said shaft for lateral tilting movement in either direction, gyroscopic means disposed within the casing and operatively engaged with said shaft for causing an oscillatory movement of the shaft in one direction or the other as the airplane turns to the right or to the left to thereby tilt the airplane figure from a transversely horizontal position to a transversely tilted position in either direction to an extent corresponding to the turning movement of the airplane, a dial disposed behind the airplane figure and having a face presented toward the figure, the dial being mounted for oscillation upon a horizontal shaft normal to the shaft upon which the airplane figure is mounted, the face of the dial having a zero indication and rate indications reading in opposite directions from the zero indication, the wall defining the sight opening having opposed index marks coacting with said indications on the dial, a chamber carried by said casing, a hollow diaphragm mounted within the chamber, means for admitting air freely to the interior of the diaphragm, constricted means for admitting air to the interior of the chamber, and operative connections between one wall of the diaphragm and said shaft to cause the oscillation of the dial in one direction as the diaphragm is expanded and the oscillation of the shaft in the other direction as the diaphragm is contracted.

6. A flight meter for airplanes having a sight opening defining a field, an airplane figure mounted within the sight opening for lateral tilting movement, a dial mounted behind said airplane figure for swinging movement upward or downward past said figure, the dial having a horizon line dividing the dial into two halves, one of said halves being differently colored from the other half, said dial having rate indications thereon reading in opposite directions from the horizon line and indicating rate of ascent or descent, means for causing a tilting of the airplane figure in one direction or the other as the airplane turns toward the right or toward the left, said means causing the airplane figure to tilt to a degree in accordance with the degree of said turning movement, means causing the dial to swing upward as the airplane moves downward and to swing downward as the airplane moves upward, the extent of said swinging movement corresponding to the rate of vertical movement of the airplane in either direction, and a transparent tube mounted below the airplane figure and extending transversely of the airplane, the tube being curved upward toward its ends and having therein a metallic ball.

7. In a flight meter for airplanes, a casing having a sight opening defining a field, a dial movable vertically behind the sight opening, the dial having a horizon line and rate indications reading in opposite directions from the horizon line, the wall defining the sight opening having opposed index marks coacting with said indications on the dial, a closed chamber carried by said casing, a hollow diaphragm disposed within the chamber, means for admitting outside air freely to the interior of the diaphragm, constricted means for admitting outside air to the interior of the chamber, a lever connected to one wall of the diaphragm and movable thereby, the free end of the lever being operatively connected to the dial to raise or lower it as the lever moves up or down under the impulse of the diaphragm.

8. In a flight meter for airplanes, a casing having a sight opening defining a field, a dial disposed within said field, the dial being mounted for vertical movement, the face of the dial having a zero indication and a horizon line and rate indications reading in opposite directions from the zero indication, a closed chamber carried by said casing, a hollow diaphragm disposed within said chamber, means for admitting outside air freely to the interior of the diaphragm comprising a hollow member mounted on the outside wall of said chamber and extending through the wall of the casing, the hollow member having a tubular connection to the interior of the diaphragm, and a hollow member having a constricted tube extending from outside the casing into the chamber and opening at its end thereinto, the outer end of the tubular member having a cap, the lateral portions of the cap being provided with relatively small air inlet openings.

9. A flight meter for airplanes having a sight opening defining a field of view, an airplane figure mounted within the sight opening for tilting movement, means for causing a tilting of the airplane figure in one direction or the other as the airplane turns toward the right or toward the left, said means causing the airplane to tilt to a degree in accordance with the degree of said turning movement, a dial movable up and down with relation to the longitudinal axis of the plane and located behind the figure, the dial having thereon a horizon line with indications of sky and ground disposed above and below the horizon line, and means operated by changes in atmospheric pressure causing the dial to move upward as the actual airplane moves downward and move downward as the actual airplane moves upward, the extent of said movement corresponding to the rate of vertical movement of the actual airplane in either direction.

ELMER J. ROGERS.